United States Patent
Wilson et al.

(10) Patent No.: US 11,014,702 B1
(45) Date of Patent: May 25, 2021

(54) DEVICE HOLDING BOX FLAPS OPEN AND DOWN, AND ALLOWING FOR SECURE BOX STACKING

(71) Applicant: Eco-Latch Systems, LLC, Pewaukee, WI (US)

(72) Inventors: Jack David Wilson, Pewaukee, WI (US); Kyle Andre Kummer, Waukesha, WI (US); Elise Prior Wilson, Yardley, PA (US); James Forsythe Wilson, III, Yardley, PA (US)

(73) Assignee: Eco-Latch Systems, LLC, Pewaukee, WI (US)

( * ) Notice: Subject to any disclaimer, the term of this patent is extended or adjusted under 35 U.S.C. 154(b) by 0 days.

(21) Appl. No.: 16/517,091

(22) Filed: Jul. 19, 2019

Related U.S. Application Data

(60) Provisional application No. 62/702,243, filed on Jul. 23, 2018.

(51) Int. Cl.
*B65D 5/00* (2006.01)
*B65D 5/42* (2006.01)
*F16B 2/22* (2006.01)

(52) U.S. Cl.
CPC ............... *B65D 5/006* (2013.01); *B65D 5/42* (2013.01); *F16B 2/22* (2013.01)

(58) Field of Classification Search
CPC ........................................... B65D 5/005–006
USPC ........................................................ 229/125
See application file for complete search history.

(56) References Cited

U.S. PATENT DOCUMENTS

| 1,497,898 | A | | 6/1924 | Fellowes |
| 2,582,502 | A | | 1/1952 | Nagler |
| 2,894,308 | A | * | 7/1959 | Eckstein ............... A44B 19/38 |
| | | | | 24/561 |
| 3,182,856 | A | | 5/1965 | Goltz |
| 3,189,250 | A | | 6/1965 | Haygeman |

(Continued)

FOREIGN PATENT DOCUMENTS

| GB | 1002655 | | 8/1965 | |
| GB | 2069459 A | * | 8/1981 | ............. B65D 5/006 |

OTHER PUBLICATIONS

Uline, website printout of https://www.uline.com/Cls_19/Edge-Protectors, as viewed on Jun. 25, 2018, 1 page.

(Continued)

*Primary Examiner* — Nathan J Newhouse
*Assistant Examiner* — Phillip D Schmidt
(74) *Attorney, Agent, or Firm* — Brannen Law Office, LLC

(57) ABSTRACT

The present invention relates to a device holding box flaps open and down along the box side walls, and allowing for secure box stacking. The device has two sides joined at a right angle at a junction. The device has an inside wall with two sections. The device has an outside wall with two sections. The inside and outside walls are joined with a rail, also having two sections. The inside wall is perpendicular to the rail, and the outside wall is divergent from the inside all relative to the rail. The inside wall, outside wall and rail define a cavity that can be slid onto a box to hold two flaps in an open position. A rim with two sections upstands from the rail. The rim is located on the middle of the rail so that a bottom of a stacked box is stacked in a secure manner.

16 Claims, 8 Drawing Sheets

(56) References Cited

U.S. PATENT DOCUMENTS

| | | | | |
|---|---|---|---|---|
| 3,349,446 A | | 10/1967 | Haygeman | |
| 3,478,867 A | * | 11/1969 | Weiss | B65D 5/0055 |
| | | | | 206/564 |
| 3,760,465 A | * | 9/1973 | Brennan | B65D 5/448 |
| | | | | 229/198.1 |
| 4,449,662 A | | 5/1984 | Okamura et al. | |
| 4,528,800 A | * | 7/1985 | Burns | B65D 5/42 |
| | | | | 229/125 |
| 4,761,935 A | | 8/1988 | King et al. | |
| 6,578,759 B1 | | 6/2003 | Ortiz | |
| D692,755 S | * | 11/2013 | Curnutt | D9/434 |
| 2007/0261216 A1 | | 11/2007 | Pauli | |
| 2009/0159476 A1 | * | 6/2009 | De Pagter | B65D 5/0055 |
| | | | | 206/423 |

OTHER PUBLICATIONS

Bee Packaging, website printout of https://www.beepackaging.com/box-flap-holders/, as viewed on Jun. 25, 2018, 6 pages.

Carton Clips Corrugated Cardboard Box Corner Flap Holders/Clamps Ten Pack (B00C3VDIA8), website printout of https://camelcamelcamel.com/product/B00C3VDIA8, as viewed on Apr. 10, 2020, 6 pages.

Item Products (UK), website printout of http://www.item-products.com/products/packing-accessories/tray-components.html, as viewed on Jun. 20, 2018, 8 pages.

* cited by examiner

DEVICE HOLDING BOX FLAPS OPEN AND DOWN, AND ALLOWING FOR SECURE BOX STACKING

This United States utility patent application claims priority on and the benefit of provisional application 62/702,243 filed Jul. 23, 2018, the entire contents of which are hereby incorporated herein by reference.

BACKGROUND OF THE INVENTION

1. Field of the Invention

The present invention relates to a device holding box flaps open and down along the sides of the walls of boxes which, at the same time, allows for secure box stacking and, in particular, to a device that has two sides defining a cavity to hold two flaps simultaneously and an integrated rail with a rim.

2. Description of the Related Art

There any many ways to secure box flaps in a closed position. There are fewer ways to hold flaps in an open position.

One simple solution to the problem of holding the box flaps in the open position is to use tape. Yet, the tape can damage the box and is not itself reusable.

Another solution to the problem of holding the box flaps in the open position is to use a band. The band is reusable. However, such a solution often yields unsatisfactory results as the bands have a tendency to move or slide in relation to the box and its flaps. Additionally, placing bands around large boxes to hold flaps down and open is ergonomically unhealthy as a result of the contorted body positions needed to accomplish this. This issue is of increased concern boxes having high flap memory, large, double walled boxes and, even more so, with the large high memory flaps on pallet boxes.

A further solution, such as a design shown in Pat. D692,755, overcomes some of the issues with tape and bands. However, this device can also be improved upon in solving the problems associated with holding box flaps in an open and down position. Further, this device does not provide the benefit of being able to stack boxes with flaps open, down and out of the way to maximize the use of floor and/or shelf space.

Other types of products are used in box stacking. One example is a corner protector sold by Item Products (http://www.item-products.co.uk/products/packing-accessories/tray-components.html). While it may be useful in box stacking, its design does not appear to account for flaps and therefore does not solve all of the problems that are solved by the present invention.

Thus, there exists a need for a device holding box flaps open, down, and at the same time, allows for secure box stacking, that solves these and other problems.

SUMMARY OF THE INVENTION

The present invention relates to a device holding box flaps open and down along the box side walls, and allowing for secure box stacking. The device has two sides joined at a right angle at a junction. The device has an inside wall with two sections. The device has an outside wall with two sections. The inside and outside walls are joined with a rail, also having two sections. The inside wall is perpendicular to the rail, and the outside wall is divergent from the inside all relative to the rail. The inside wall, outside wall and rail define a cavity that can be slid onto a box to hold two flaps in an open position. A rim with two sections upstands from the rail. The rim is located on the middle of the rail so that a bottom of a stacked box is stacked in a secure manner.

According to one advantage of the present invention, one device can hold two box flaps open and down. Two devices can hold all four flaps open and down.

According to another advantage of the present invention, holding the flaps open and down allows for the insertion or removal of contents uninterrupted and undamaged by partially open flaps striking or disrupting the insertion or removal of contents. Additionally, the flaps are held securely against the walls as opposed to being free floating. This allows for transport through conveyor systems without confusing or disrupting the sensors and saving floor, rack and shelf space by allowing for side-by-side storage of open boxes.

According to another advantage of the present invention, the inside wall is perpendicular to the rail. In this regard, the device can seat tightly against the inside corner of the box.

According to a further advantage of the present invention, the outside wall is divergent from the inside wall relative to the rail. In this regard, the device can accommodate flaps of varying thickness and can be easily slid over the flaps.

According to a still further advantage of the present invention, the inside wall can be taller than the outside wall. In this regard, the intersection of the inside wall can contact the box intersection, and this can guide the cavity to receive the box flaps as the device is inserted onto the corner of the box. This corner device geometry and angled insertion results in easier insertion both manually by humans and in an automated setting with robots.

According to a still further advantage yet of the present invention, the device is tall and flexible enough that it is unlikely to slide off boxes with variable length flaps when exposed to the forces of flaps with high elastic responses.

According to a still further advantage yet of the present invention, the device is reusable, is usable with both manual and robotic insertion and removal, and does not damage the box during use.

According to a still further advantage yet of the present invention, ribs can be provided to assist in stabilizing the device on the box by enhancing their grip. Because the device is designed primarily for paper corrugate, the ribs can indent the malleable corrugate to increase the surface content of the device, adding holding power as this occurs.

According to a still further advantage of the present invention, an upstanding rim can be included allowing boxes to be safely and securely stacked. The rim of two devices effectively defines two opposite corners allowing open boxes to be stacked upon each other while the box is in the open position. This is accomplished as an interior portion of the rail supports the weight of the box and the rim prevents lateral movement of the box or its attached base off of the rail.

According to a still further advantage yet of the present invention, the rim can be located approximately halfway across the rail. This advantageously allows the flap in the cavity to be outside of the rim plane and the box sidewall to be within the rim plane. Hence, sidewalls of an adjacent box are stacked in line with the box sidewalls below.

Other advantages, benefits, and features of the present invention will become apparent to those skilled in the art upon reading the detailed description of the invention and studying the drawings.

DETAILED DESCRIPTION OF PREFERRED EMBODIMENTS

Figure 1:
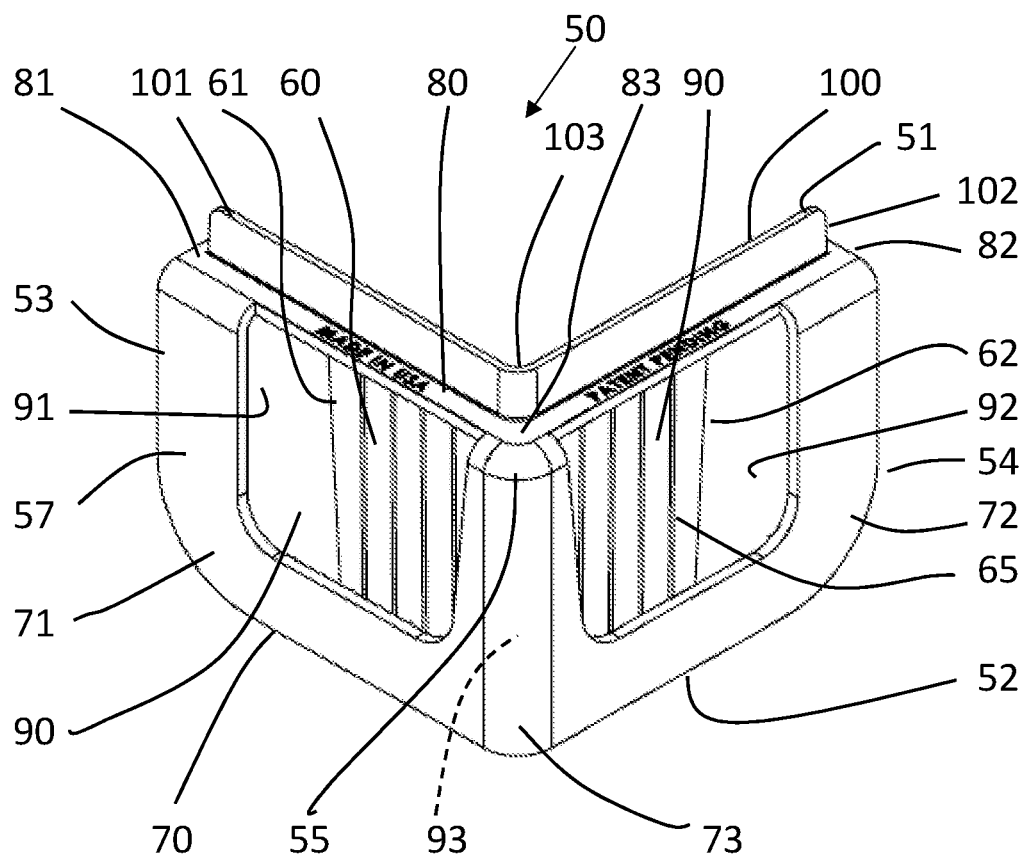
FIG. 1 is a perspective view showing a preferred embodiment of the present invention.
Figure 2:
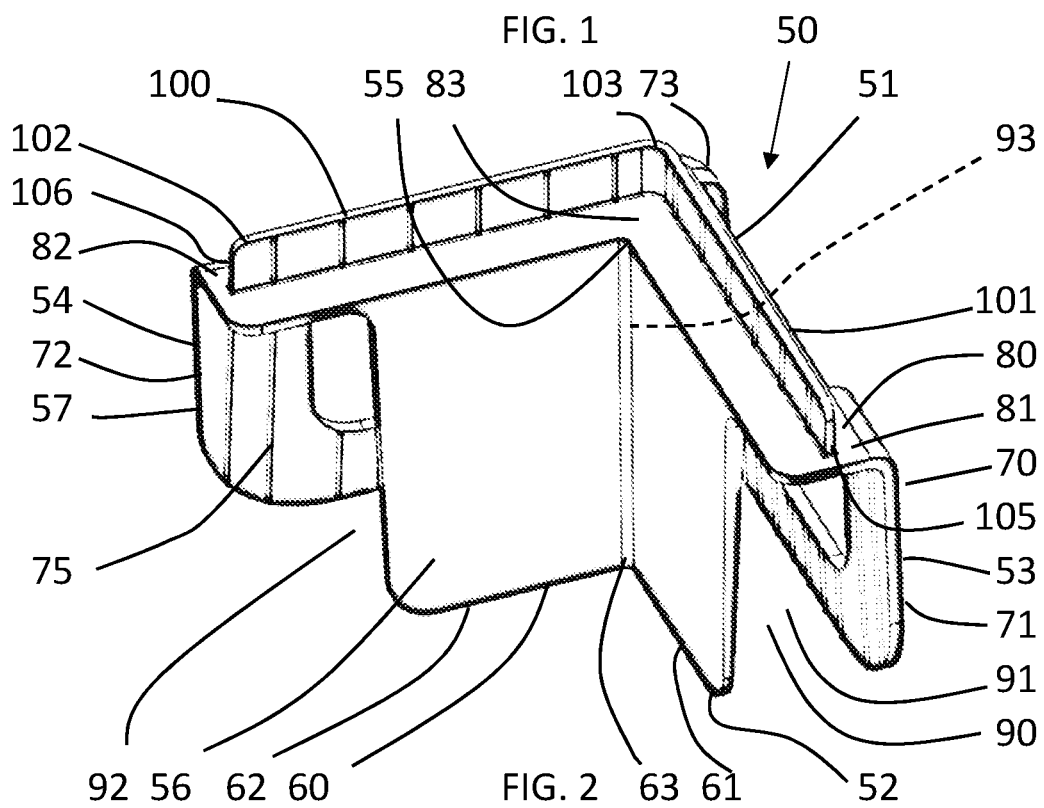
FIG. 2 is a reverse perspective view of the embodiment illustrated in FIG. 1.
Figure 3:
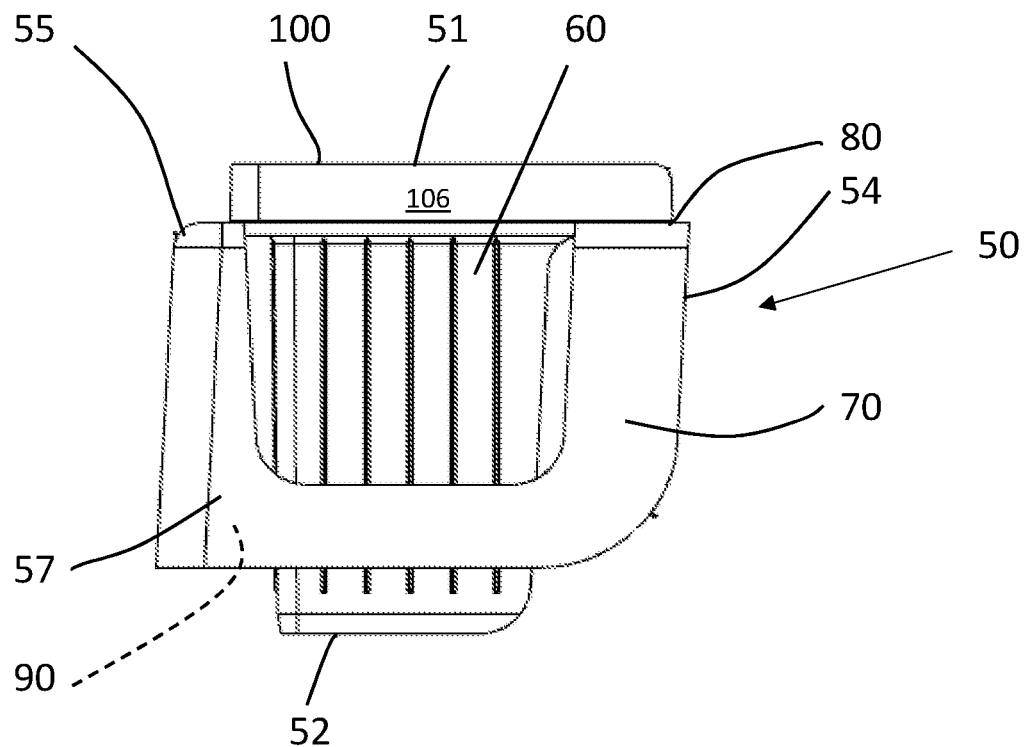
FIG. 3 is a side view of the embodiment illustrated in FIG. 1.
Figure 4:
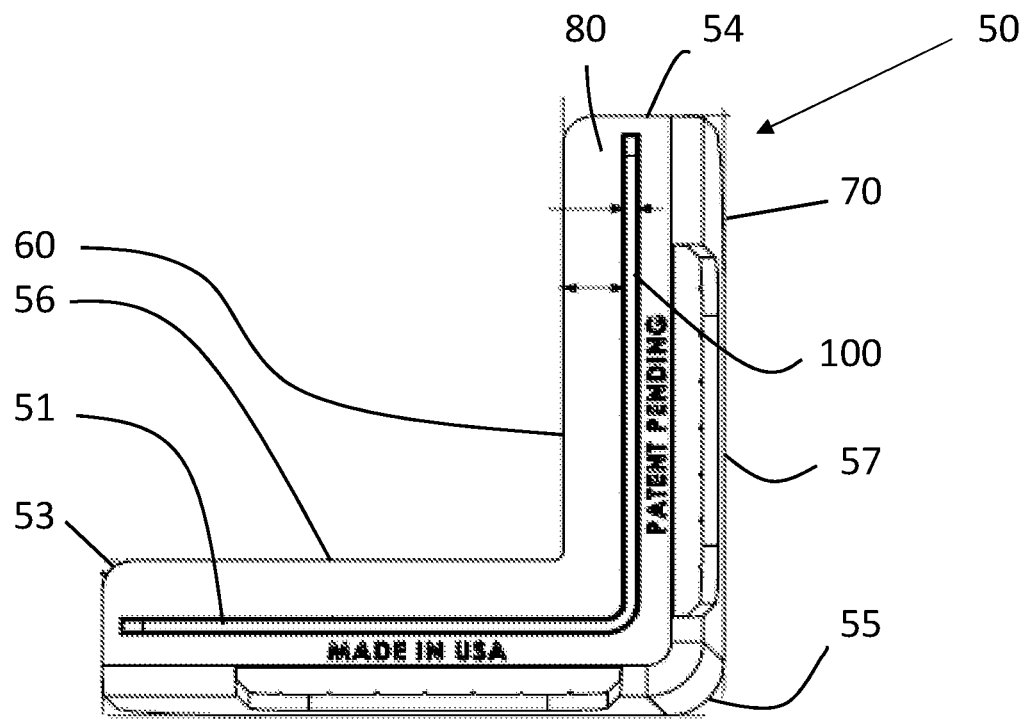
FIG. 4 is a top view of the embodiment illustrated in FIG. 1.
Figure 5:
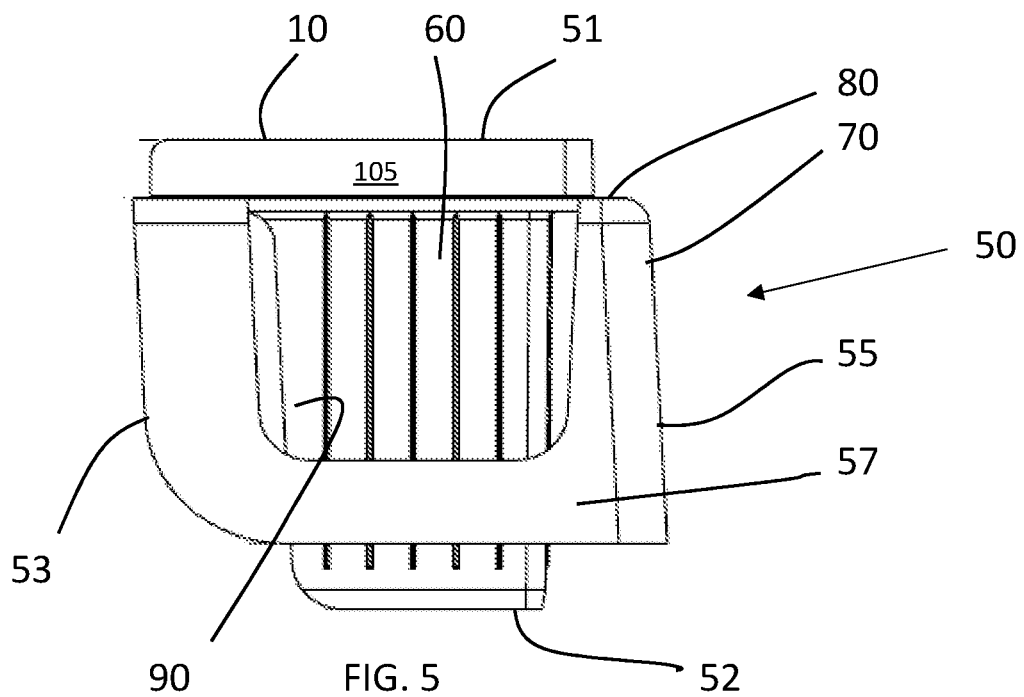
FIG. 5 is an opposite side view of the embodiment illustrated in FIG. 1.
Figure 6:
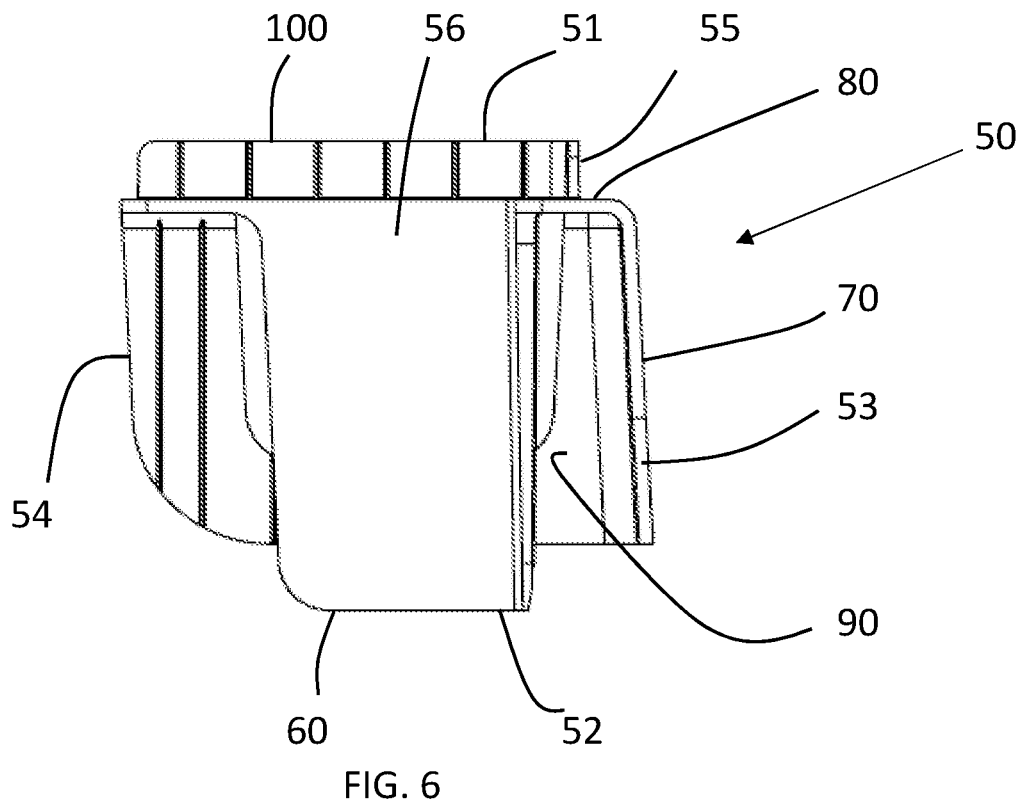
FIG. 6 is an end view of the embodiment illustrated in FIG. 1.
Figure 7:
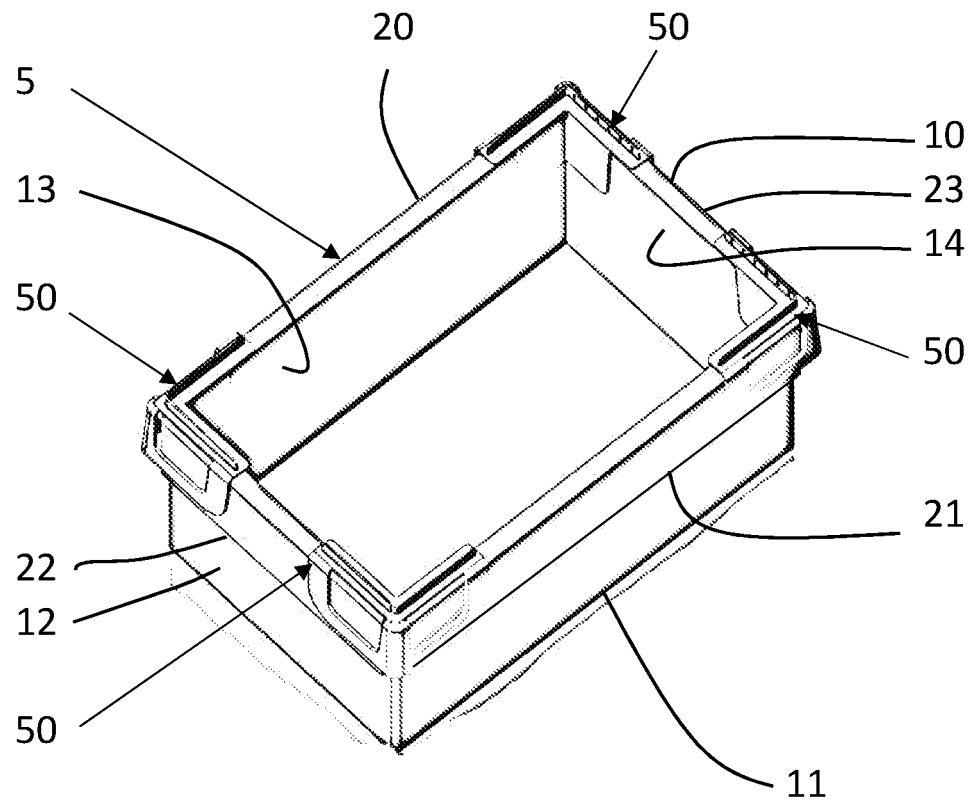
FIG. 7 is a perspective view showing four devices used on a box.
Figure 8:
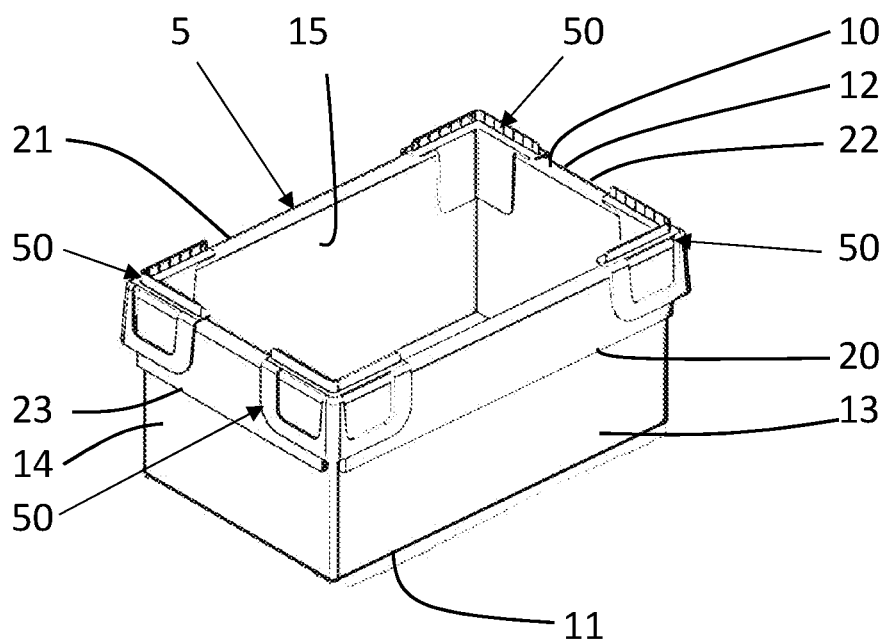
FIG. 8 is an alternative perspective view showing four devices used on a box.
Figure 9:
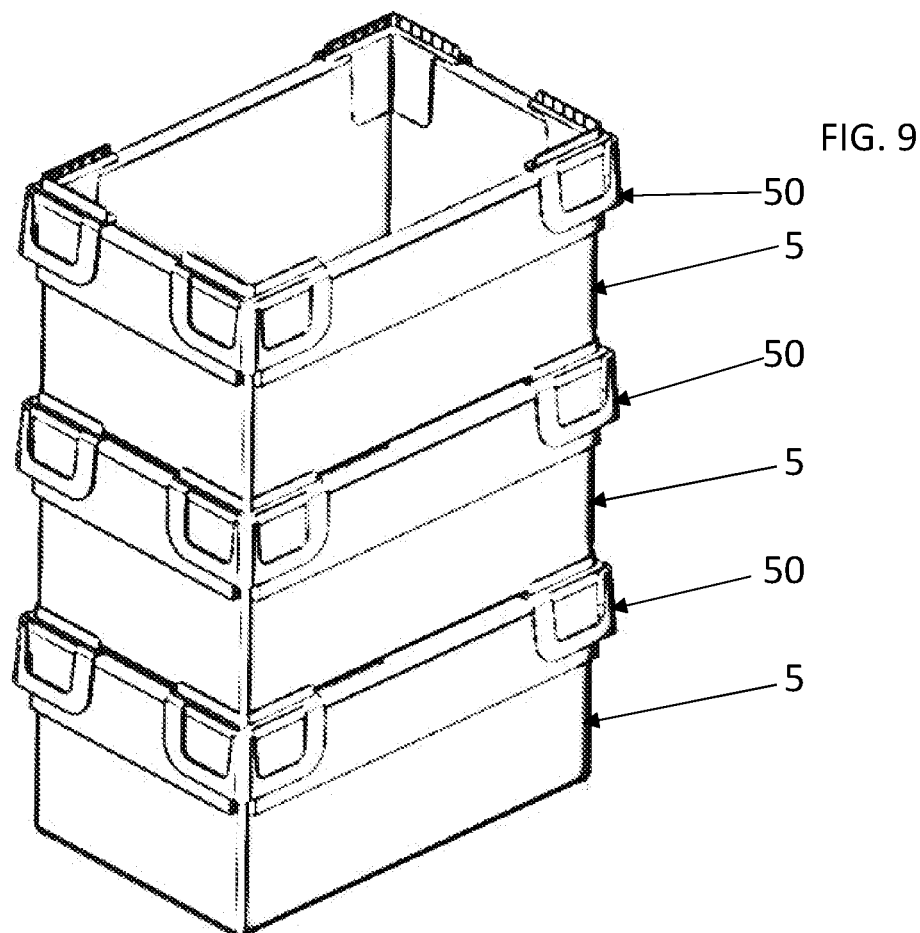
FIG. 9 is a perspective view showing three stacked boxes.
Figure 10:
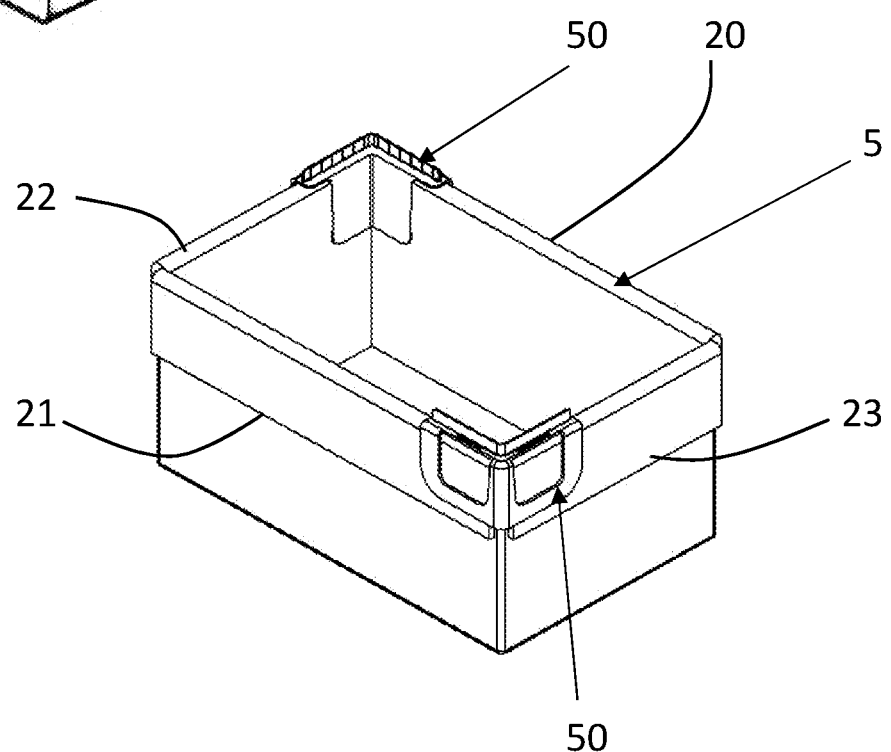
FIG. 10 is a perspective view showing two corner devices used to hold open and down four flaps.
Figure 11:
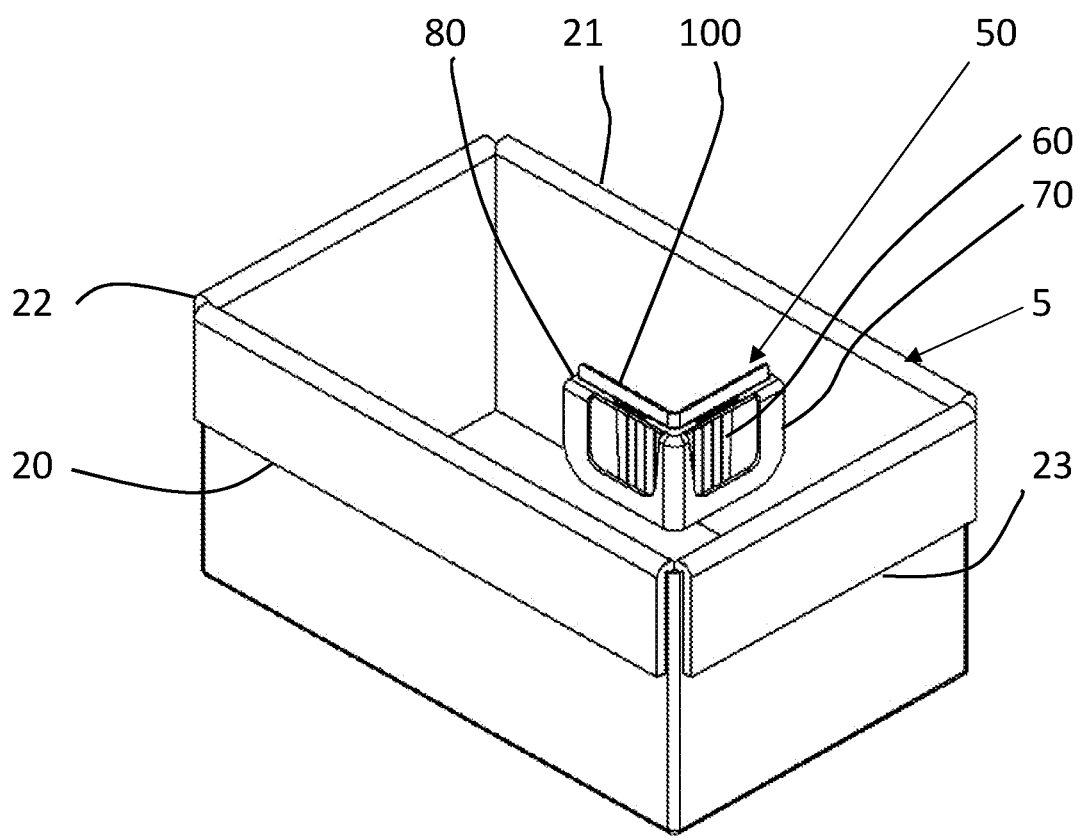
FIG. 11 is a perspective view showing a corner device being inserted onto a box.
Figure 12:
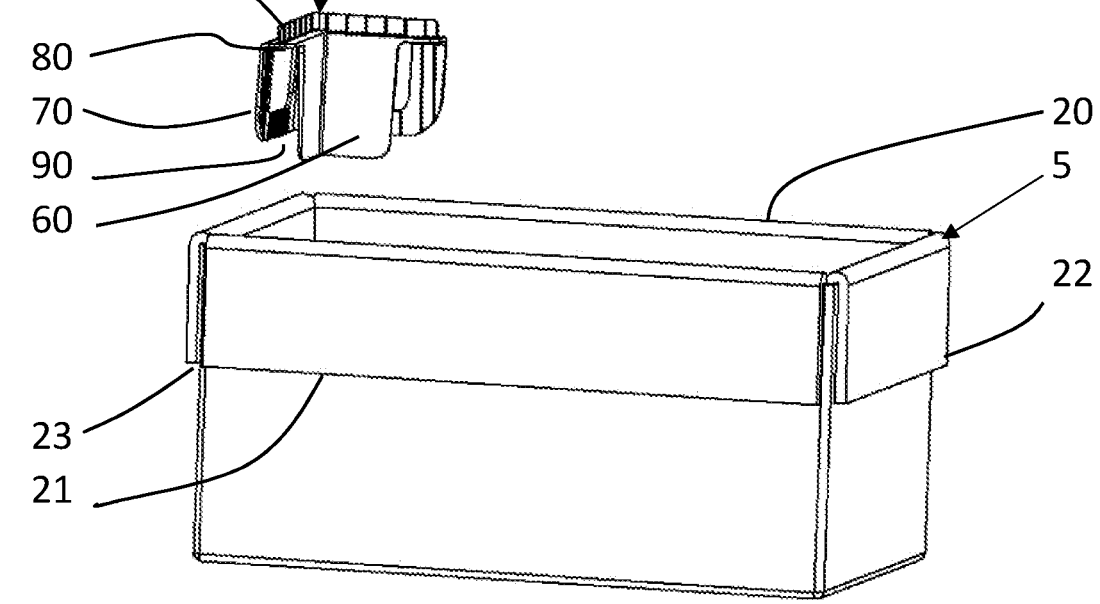
FIG. 12 is an alternative perspective view showing a corner device being inserted onto a box.

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

A preferred embodiment of the device 50 of the present invention is illustrated in isolation in FIGS. 1-6.

The device 50 is shown with a box 5 in FIGS. 7-14. An exemplary box 5 has a top 10 and a bottom 11. The box further has four sides 12, 13, 14 and 15, respectively. Four flaps 20, 21, 22 and 23 are provided. Flaps 20 and 21 are sometimes called major flaps. Flaps 22 and 23 are sometimes called minor flaps. Regardless, all the flaps 20, 21, 22 and 23 can be opened or closed. In the closed position, the flaps are flat atop the box. It is appreciated that the boxes for use with the present invention can be made of various materials (such as card board, plastic, or otherwise) and that the thicknesses of the parts (in particular, the flaps) of the box can vary without departing from the broad aspects of the present invention.

Returning now to FIGS. 1-6, it is seen that the device 50 has an inside wall 60, an outside wall 70, a rail 80, a cavity 90 and a rim 100. Each of these parts are described below. The corner device 50 is preferably made of plastic. Yet, it is appreciated that other materials could be used without departing from the broad aspects of the present invention.

The corner device 50 has a top 51 and a bottom 52. The device 50 has two sides 53 and 54, respectively, that meet at a junction 55 or intersection. The sides 53 and 54 are preferably oriented at right angles relative to each other and are symmetrical about the junction 55. The device 50 has an inside 56 and an outside 57.

The inside wall 60 has a first section 61 and a second section 62. The first section 61 and second section 62 meet at an intersection 63. The first section 61 is preferably perpendicular to the second section 62. The inside wall 60 preferably has a height of 3.5 inches. Each section preferably has a length of 2¾ inches. The inside wall 60 has an interior and an exterior. The interior preferably has ribs 65 and the exterior is preferably smooth. The inside wall preferably has a decreasing thickness from top to bottom (thickest at top) and accordingly is stiffest at the top, the point at which the most flap resistance to the lower wall exists.

The outside wall 70 has a first section 71 and a second section 72. The first section 71 and second section 72 meet at an intersection 73. The first section 71 is preferably perpendicular to the second section 72. The outside wall 70 preferably has a height of 2.60 inches. Each section preferably has a length of 3.87 inches. The outside wall 70 has an interior and an exterior. The interior preferably has ribs 75 and the exterior is preferably smooth. Each section preferably has an opening there through. The outside wall 70 is accordingly more flexible than the inside wall (having a solid construction) in order to accommodate the external pressure exerted by the flaps as they are extended downward and open.

The rail 80 has a first section 81 and a second section 82. The first section 81 and second section 82 meet at an intersection 83. The first section 81 is preferably perpendicular to the second section 82 when viewed from above. The rail 80 spans between the inside wall 60 and outside wall 70. The rail 80 is preferably flat and has a width of 1.00 inch. Rail 80 is preferably perpendicular to inside wall 60. The outside wall 70 is preferably divergent from the inside wall 60 relative to the rail 80. In this regard, the distance between the inside wall 60 and outside wall 70 increases with the distance from the rail.

The inside wall 60, outside wall 70 and rail 80 define a cavity 90. The cavity 90 has a first section 91 and a second section 92 that meet at an intersection 93. The first section 91 is preferably perpendicular to the second section 92. The cavity has a cavity width between the inside wall 60 and outside wall 70. The cavity width, at the top end of the cavity, is preferably two times the thickness of a box wall or flap thickness.

The corner device 50 further has a rim 100. The rim 100 has a first section 101 and a second section 102 that meet at an intersection 103. The first section 101 is preferably perpendicular to the second section 102. The rim 100 is upstanding from the rail 80. The rim 100 accordingly extends away from the rail 80 in a direction opposite of the inside wall 60 and outside wall 70. The rim 100 is preferably perpendicular to the rail 80. The rim preferably has a height of 0.44 inches. The rim 100 is preferably positioned at any point between the inside wall 60 and outside wall 70. The rim is more preferably positioned within the middle 60% of the distance between the inside wall 60 and outside wall 70. The rim is even more preferably positioned within the middle 10% of the distance between the inside wall 60 and outside wall 70. The rim 100 is most preferred to be located halfway between the inside wall 60 and outside wall 70.

Turning now again to FIGS. 7-14, the use of the invention is illustrated. Two devices (FIG. 10) or four devices (FIGS. 7-19) may be used to hold flaps open and down. Two are sufficient, yet four may provide additional benefits particularly in a stacking situation.

Figure 13:
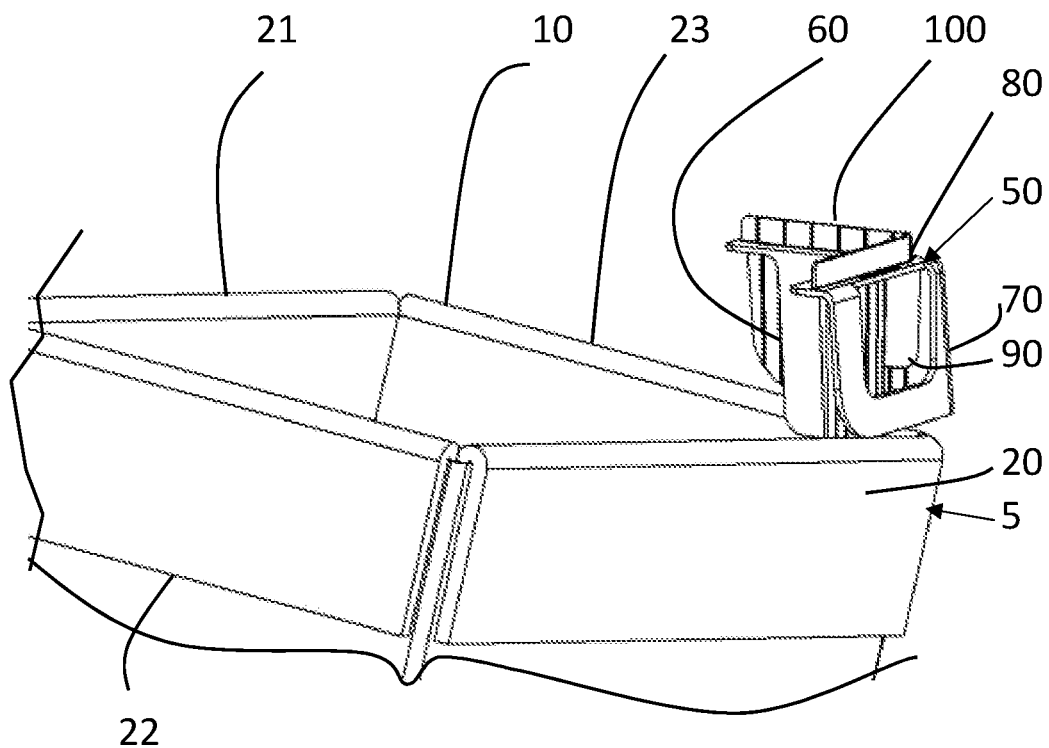
FIG. 13 is partial perspective view showing a corner device inside wall contacting the box to guide the corner device.
Figure 14:
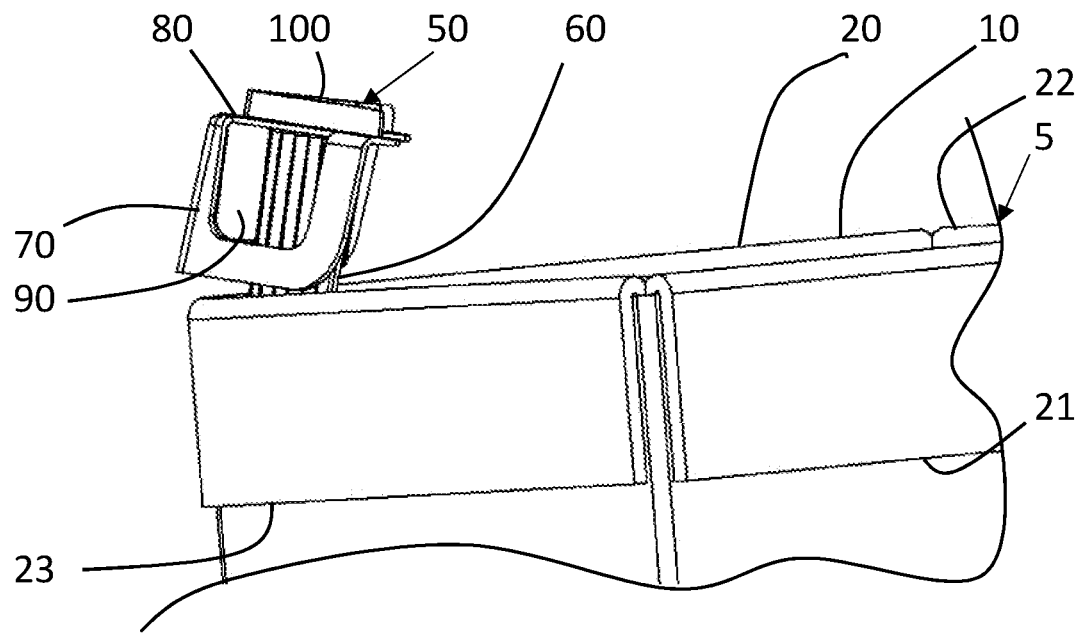
FIG. 14 is an alternative partial perspective view showing a corner device inside wall contacting the box to guide the corner device.

A device 50 can be inserted onto a corner of a box 5 when two flaps 20 and 23, for example, are in the open position and folded back onto the sides 12 and 13, respectively o the box 5. The inside wall 60 can contact the interior intersection of side 12 and 13 wherein the cavity is directed on the box 5 to receive the sides and flaps as seen in FIGS. 13 and 14. When the box 5 is fully mated in the cavity 90, it is appreciated that the rim 100 upstands from the box. The rim sections 101 and 102 lie in respective rim section planes 105 and 106 wherein the box wall is inside of the respective rim section plane and the box flaps are outside of the rim section plane. The location of the rim 100 allows an additional box to be stacked on an open box as the rim is located to receive the outside of the box in a secure manner without unnecessary and unwanted clearance (which would be the case if the rim was on the outside edge of the device 50. Further, the walls of stacked boxes lie in the same respective four planes.

It is appreciated that several preferred dimensions are provided herein. It is understood that the dimensions could change without departing from the broad aspects of the present invention.

Figure 15:
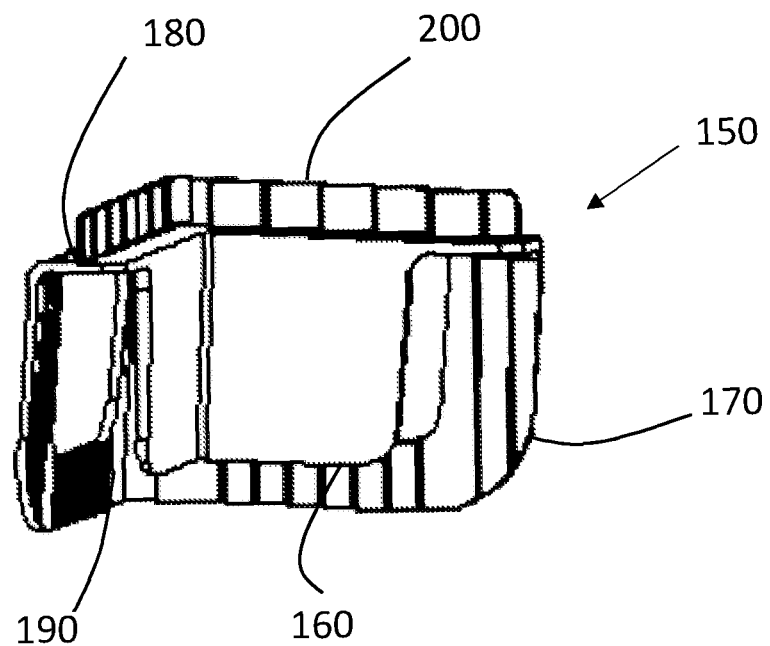
FIG. 15 is a perspective view of an alternative embodiment of the present invention.
Figure 16:
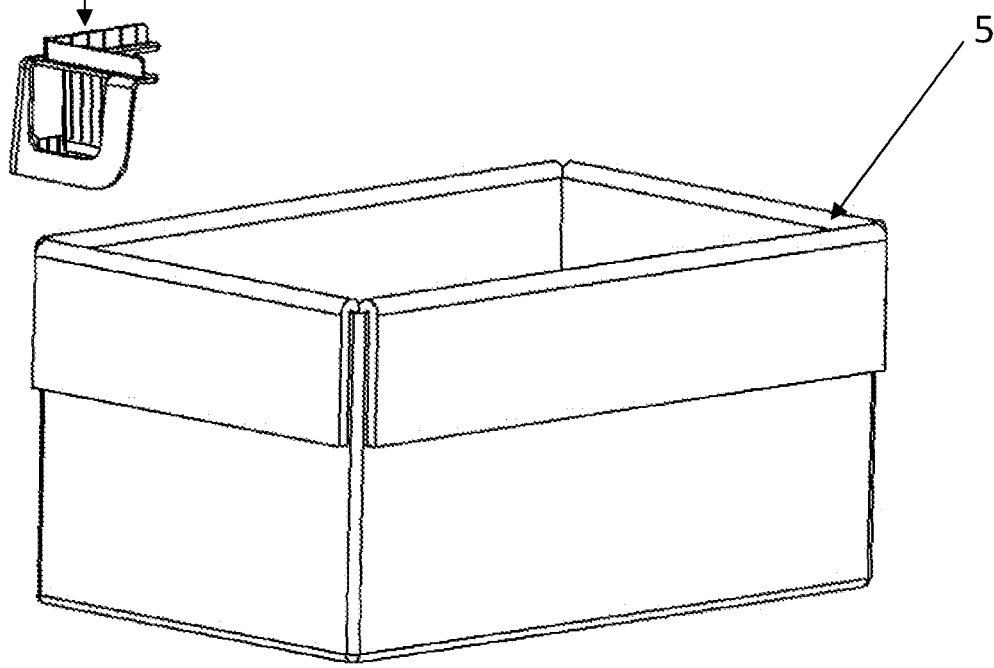
FIG. 16 is a perspective view showing the corner device of FIG. 15 being inserted onto a box.

Turning now to FIGS. 15 and 16, it is seen that an alternative embodiment of a corner device 150 is illustrated having an inside wall 160, an outside wall 170, a rail 180, a cavity 190 and a rim 200.

Corner device 150 is similar to corner device 50 discussed above with a distinction that with corner device 150, the outside wall 170 is taller than the inside wall 160. This geometry is useful in applications where an angled approach of the corner device 150 to the box 5 is coming from a location exterior of the box perimeter.

Thus, it is apparent that there has been provided, in accordance with the invention, a device holding box flaps open and allowing for secure box stacking that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A corner device for holding a first flap open and down adjacent to a box first sidewall and a second flap open and down adjacent to a box second sidewall, said corner device comprising:
    an inside wall, said inside wall having an inside wall first section and an inside wall second section, said inside wall second section being oriented perpendicular to said inside wall first section;
    an outside wall, said outside wall having an outside wall first section and an outside wall second section;
    a rail, said rail having a rail first section and a rail second section, said rail second section being oriented perpendicular to said rail first section, said rail being connected to said inside wall and said outside wall, wherein said rail, said inside wall and said outside wall defining a cavity, said cavity receives the first flap, the box first sidewall, the second flap and the box second sidewall to hold the first flap open and down adjacent to the box first sidewall and the second flap in an open and down position adjacent to the box second sidewall; and
    a rim upstanding from said rail, wherein:
        said rim has a rim first section and a rim second section, said rim second section being oriented perpendicular to said rim first section;
        said rim first section lies in a rim first section plane;
        said rim second section lies in a rim second section plane; and
        said rim is located on said rail at a location within a middle 10% of a span between where said inside wall and said outside wall connect to said rail.

2. The corner device of claim 1, wherein:
    said rim is located halfway between said inside wall and said outside wall;
    the first flap is held between said rim first section plane and said outside wall and the second flap is held between said rim second section plane and said outside wall when said cavity receives the first flap, the box first sidewall, the second flap and the box second sidewall to hold the first flap open and down adjacent to the box first sidewall and the second flap in an open and down position adjacent to the box second sidewall.

3. The corner device of claim 2 wherein the box first sidewall is held between said rim first section plane and said inside wall and the box second sidewall is held between said rim second section plane and said inside wall when said cavity receives the first flap, the box first sidewall, the second flap and the box second sidewall to hold the first flap open and down adjacent to the box first sidewall and the second flap in an open and down position adjacent to the box second sidewall, whereby a second box is stackable upon the box and is bound by said rim first section and said rim second section.

4. The corner device of claim 1, wherein:
    said inside wall first section lies in an inside wall first section plane, said outside wall first section lies in an outside wall first section plane, and said rail first section lies in a rail first section plane,
    said inside wall first section plane is perpendicular to said rail first section; and
    said outside wall first section plane and said inside wall first section plane are oriented divergent to each other relative to said rail first section.

5. The corner device of claim 1, wherein:
    said inside wall has an inside wall height;
    said outside wall has an outside wall height; and
    said inside wall height is greater than said outside wall height.

6. A corner device for holding a first flap open and down adjacent to a box first sidewall and a second flap open and down adjacent to a box second sidewall, said corner device comprising:
    an inside wall;
    an outside wall;
    a rail connected to said inside wall and said outside wall said rail, said inside wall and said outside wall defining a cavity, said inside wall and said outside wall being divergent relative to said rail whereby said cavity is narrower adjacent to said rail and wider remote from said rail; and
    a rim upstanding from said rail, said rim being located at a location within a middle 10% of a span between where said inside wall and said outside wall connect to said rail,
    wherein:

said inside wall has an inside wall height;
said outside wall has an outside wall height; and
said inside wall height is different than said outside wall height.

7. The corner device of claim 6, wherein:
said inside wall has an inside wall first section and an inside wall second section, said inside wall second section being oriented perpendicular to said inside wall first section;
said outside wall has an outside wall first section with an outside wall first section bottom edge and an outside wall second section with an outside wall second section bottom edge, said outside wall second section bottom edge being oriented perpendicular to said outside wall first section bottom edge;
said rail has a rail first section and a rail second section, said rail second section being oriented perpendicular to said rail first section; and
said cavity receives the first flap, the box first sidewall, the second flap and the box second sidewall to hold the first flap open and down adjacent to the box first sidewall and the second flap in an open and down position adjacent to the box second sidewall.

8. The corner device of claim 7 wherein said rim has a rim first section lying in a rim first section plane and a rim second section lying in a rim second section plane, said rim being located halfway between where said inside wall and said outside wall connect to said rail, wherein the first flap is held between said rim first section plane and said outside wall and the second flap is held between said rim second section plane and said outside wall when said cavity receives the first flap, the box first sidewall, the second flap and the box second sidewall to hold the first flap open and down adjacent to the box first sidewall and the second flap in an open and down position adjacent to the box second sidewall.

9. The corner device of claim 6, wherein:
said inside wall has inside wall interior ribs; and
said outside wall has outside wall interior ribs.

10. The corner device of claim 6, wherein:
said inside wall is perpendicular to said rail; and
said outside wall and said inside wall are oriented in divergent planes to each other relative to said rail.

11. The corner device of claim 6, wherein said inside wall height is greater than said outside wall height.

12. A corner device for holding a first flap open and down adjacent to a box first sidewall and a second flap open and down adjacent to a box second sidewall, said corner device comprising:
an inside wall, said inside wall having an inside wall first section lying in an inside wall first section plane and an inside wall second section lying in an inside wall second section plane;
an outside wall, said outside wall having an outside wall first section lying in an outside wall first section plane and an outside wall second section lying in an outside wall second section plane;
a rail connected to said inside wall and said outside wall, wherein said rail, said inside wall and said outside wall define a cavity; and
a rim upstanding from said rail,
wherein:
said inside wall is generally perpendicular to said rail;
said outside wall first section plane and said inside wall first section plane are oriented divergent to each other relative to said rail wherein said cavity is narrower near said rail and wider remote from said rail; and
said rim is located at a location within a middle 10% of a span between where said inside wall and said outside wall connect to said rail.

13. The corner device of claim 12, wherein:
said outside wall first section has an outside wall first section bottom edge;
said outside wall second section has an outside wall second section bottom edge;
said inside wall second section is oriented perpendicular to said inside wall first section;
said outside wall second section bottom edge is oriented perpendicular to said outside wall first section bottom edge;
said rail has a rail first section and a rail second section, said rail second section being oriented perpendicular to said rail first section; and
said cavity receives the first flap, the box first sidewall, the second flap and the box second sidewall to hold the first flap open and down adjacent to the box first sidewall and the second flap in an open and down position adjacent to the box second sidewall.

14. The corner device of claim 13, wherein:
said inside wall has inside wall interior ribs; and
said outside wall has outside wall interior ribs.

15. The corner device of claim 12, wherein:
said inside wall has an inside wall height;
said outside wall has an outside wall height; and
said inside wall height is greater than said outside wall height.

16. The corner device of claim 12 wherein said rim is located halfway between where said inside wall and said outside wall connect to said rail, wherein the first flap is held between said rim first section plane and said outside wall and the second flap is held between said rim second section plane and said outside wall when said cavity receives the first flap, the box first sidewall, the second flap and the box second sidewall to hold the first flap open and down adjacent to the box first sidewall and the second flap in an open and down position adjacent to the box second sidewall.

\* \* \* \* \*